United States Patent
Ochiai et al.

(10) Patent No.: US 7,465,763 B2
(45) Date of Patent: Dec. 16, 2008

(54) CURABLE COMPOSITION AND RESIN MOLDED ARTICLE WITH HYDROPHILIC FILM OF THE COMPOSITION

(75) Inventors: Shinsuke Ochiai, Niihama (JP); Hiroshi Sasaki, Mito (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 496 days.

(21) Appl. No.: 10/967,158

(22) Filed: Oct. 19, 2004

(65) Prior Publication Data

US 2005/0085566 A1    Apr. 21, 2005

(30) Foreign Application Priority Data

Oct. 21, 2003   (JP) ............................. 2003-360323
Oct. 21, 2003   (JP) ............................. 2003-360324

(51) Int. Cl.
*C08K 3/34* (2006.01)

(52) U.S. Cl. ...................................... 524/492; 524/493

(58) Field of Classification Search ................ 524/492, 524/493

See application file for complete search history.

(56) References Cited

U.S. PATENT DOCUMENTS 6,696,515 B2 * 2/2004 Yamaya et al. .............. 524/506
7,166,361 B2 * 1/2007 Baba et al. .................. 428/447

FOREIGN PATENT DOCUMENTS

| JP | 7-299890 A | 11/1995 |
| JP | 8-3478 A | 1/1996 |
| JP | 11-217560 A | 8/1999 |
| JP | 2000-289134 A | 10/2000 |
| JP | 2004-99695 A | 4/2004 |
| JP | 2004-292754 A | 10/2004 |

* cited by examiner

Primary Examiner—Edward J Cain
(74) Attorney, Agent, or Firm—Sughrue Mion, PLLC

(57) ABSTRACT

A composition comprising inorganic compound particles and at least one compound selected from hydrolyzable organic silicon compounds, hydrolysis products thereof and multimers of the hydrolysis products is provided, wherein based on 100 parts of the total weight of the inorganic compound particles and the at least one compound, the composition contains (i) 60-80 parts of the inorganic compound particles in which the inorganic compound has an average particle diameter of 40 nm or less, when the composition contains 20-40 parts of the at least one compound and (ii) 40-60 parts of the inorganic compound particles in which the inorganic compound particles are selected from chain-shaped particles and needle-shaped particles, when the composition contains 40-60 parts of the at least one compound.

11 Claims, No Drawings

CURABLE COMPOSITION AND RESIN MOLDED ARTICLE WITH HYDROPHILIC FILM OF THE COMPOSITION

BACKGROUND OF THE INVENTION

1. Field of the Invention

The present invention relates to a composition comprising at least one compound selecting from the group consisting of hydrolyzable organic silicon compounds, hydrolysis products thereof and multimers of the hydrolysis products, and inorganic compound particles; and also relates to a resin molded article having a cured film of the composition formed on the surface thereof.

2. Description of the Related Art

A resin molded article having a hydrophilic film formed on the surface thereof is suitably used in outdoor applications since the hydrophilic film has a function of preventing a dust from adhering thereto or easily removing a dust therefrom. For instance, Japanese Patent Application Laid-Open No. 7-299890 proposes that a synthetic resin plate is used for an outdoor sound-insulating plate, in which the plate has on the surface thereof a fluorine resin film with an antifouling layer containing a hydrophilic colloidal inorganic material. In addition, Japanese Patent Application Laid-Open No. 8-3478 proposes that a transparent synthetic resin molded plate with a hydrophilic property is used for a street side wall plate, in which the plate has on the surface thereof a covering layer with a contact angle of 50° or less relative to water, the layer being made of an inorganic colloidal sol.

The above-described conventional hydrophilic resin molded articles/plates are not necessary sufficient in adhesion properties to resin molded articles/plates and anti-abrasion properties of the hydrophilic films, and thus causes the hydrophilic films to be easily peeled off and be damaged. Also, the transparency of the hydrophilic films is not necessary sufficient in some cases so that the function and appearance of the resin molded articles/plates may be deteriorated in some cases.

SUMMARY OF THE INVENTION

Thus, one of objects of the present invention is to provide a resin molded article suitable in outdoor applications in which the article has on the surface thereof a hydrophilic film excellent in transparency, adhesion properties to a resin molded article therein and anti-abrasion properties.

The present inventors have earnestly studied to develop such an article. As a result, it has been found that such an article can be obtained by forming a film capable of functioning as a hydrophilic film on the surface of a resin molded article using a curing composition comprising a hydrolyzable organic silicon compound and inorganic compound particles. The present invention has been accomplished based on the findings.

The present invention provides a composition comprising inorganic compound particles and at least one compound selected from the group consisting of hydrolyzable organic silicon compounds, hydrolysis products thereof and multimers of the hydrolysis products, wherein based on 100 parts by weight of the total weight of the inorganic compound particles and the at least one compound, the composition contains:

(i) 60 parts by weight to 80 parts by weight of the inorganic compound particles in which the inorganic compound has an average particle diameter of 40 nm or less, when the composition contains the at least one compound in the amounts of from 20 parts by weight to 40 parts by weight; and (ii) 40 parts by weight to 60 parts by weight of the inorganic compound particles in which the inorganic compound particles are selected from the group consisting of chain-shaped, inorganic compound particles and needle-shaped, inorganic compound particles, when the composition contains the at least one compound in the amounts of from 40 parts by weight to 60 parts by weight.

Further, the present invention provides a covered resin molded article comprising a resin molded article and a cured film present on at least a portion of the surface thereof, wherein the cured film is a film made from the above-described composition.

DESCRIPTION OF THE PREFERRED EMBODIMENTS

A covered resin molded article in the present invention comprises a resin molded article as a substrate and a film formed on the surface of the resin molded article. The film can provide the resin molded article with high hydrophilicity, resulting in high antifouling property. The film can be obtained by curing a composition of the present invention, which comprises inorganic compound particles and at least one compound selected from the group consisting of hydrolyzable organic silicon compounds, hydrolysis products thereof and multimers of the hydrolysis products. Hereinafter, the film in the present invention is referred to as a hydrophilic film.

The thickness of a hydrophilic film in the present invention may be in the range of from 10 nm to 1000 nm, and is preferably in the range of from 50 nm to 500 nm. When the thickness of the hydrophilic film is too small, the hydrophilicity and strength of the film may be insufficient in some cases. On the other hand, when the thickness of the hydrophilic film is too large, the adhesiveness to a substrate and transparency of the film may be insufficient, and also defects such as cracks in the film may occur in some cases.

The hydrophilic film on the substrate in the present invention may have a contact angle of 30° or less, and is preferably 20° or less, relative to water.

The resin molded article as a substrate used in a covered resin molded article of the present invention are not particularly limited, and examples thereof include molded articles produced by molding resins such as a polymethylmethacrylate resin, a polycarbonate resin, a polystyrene, a copolymer resin of methylmethacrylate and styrene, a copolymer resin of acrylonitrile and styrene and a triacetylcellulose resin, into a flat-plate shape, a plate shape having curvature including a wave-plate shape and a three dimensional shape such as rectangular solid and sphere. Particularly, a molded article of methylmethacrylate resin is suited as a substrate, since it is excellent in weather resistance.

The substrate used in the present invention may have flat and smooth surface or may have a surface with fine irregularities. Also, there may be another film such as a hard coat layer having anti-abrasion properties between the surface of the substrate and the hydrophilic film in a covered resin molded article of the present invention. Alternatively, the film such as a hard coat may be formed on the outermost surface of a covered resin molded article in the present invention.

In a covered resin molded article in the present invention, the hydrophilic film may be formed on the entire of the substrate surface of the article or may be partially formed thereon. For instance, when the substrate has a planar shape, hydrophilic films may be formed on both surfaces thereof, or may be formed on either one of surfaces only.

In the present invention, a composition comprising inorganic compound particles and at least one compound selected from the group consisting of hydrolyzable organic silicon compounds, hydrolysis products thereof and multimers of the hydrolysis products is provided, wherein based on 100 parts by weight of the total weight of the inorganic compound particles and the at least one compound, the composition contains:

(i) 60 parts by weight to 80 parts by weight of the inorganic compound particles in which the inorganic compound has an average particle diameter of 40 nm or less, when the composition contains 20 parts by weight and more but less than 40 parts by weight of the at least one compound; and (ii) 40 parts by weight to 60 parts by weight of the inorganic compound particles in which the inorganic compound particles are selected from the group consisting of chain-shaped, inorganic compound particles and needle-shaped, inorganic compound particles, when the composition contains 40 parts by weight and more but less than 60 parts by weight of the at least one compound.

It is noted that the above-mentioned "total weight of the inorganic compound particles and the at least one compound" means the total weight of the inorganic compound particles, the hydrolyzable organic silicon compounds, the hydrolysis products and the multimers.

Preferably, the composition contains:

(i) 80 parts by weight or less but more than 60 parts by weight of the inorganic compound particles in which the inorganic compound has an average particle diameter of 40 nm or less, when the composition contains 20 parts by weight and more but less than 40 parts by weight of the at least one compound; and (ii) 40 parts by weight or more, but 60 parts by weight or less of the inorganic compound particles in which the inorganic compound particles are selected from the group consisting of chain-shaped, inorganic compound particles and needle-shaped, inorganic compound particles, when the composition contains 40 parts by weight and more but 60 parts by weight or less of the at least one compound, based on 100 parts by weight of the total weight of the inorganic compound particles and the at least one compound.

A hydrophilic film in the present invention can be obtained by curing the above-described composition.

A hydrolyzable organic silicon compound used in the present invention has at least one hydrolyzable group (that is a group capable of being hydrolyzed) within a molecule thereof, which is a compound having organic groups bonding to a silicon atom. Specifically, the hydrolyzable organic silicon compound can be represented by following formula (I) below:

$$Si(R_1)_q(R_2)_{4-q} \quad (I)$$

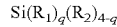

wherein $R_1$ is a hydrogen atom or a mono-valent organic group which is not subjected to hydrolysis, $R_2$ is a hydrolyzable group, and q is 0 or an integer of 1 to 3.

Examples of the inert mono-valent organic group represented by $R_1$ in formula (I) include an alkyl group having a carbon number of 1 to 4, an alkenyl group having a carbon number of 2 to 4, an aryl group including a phenyl group, and the like. Also, hydrolyzable groups represented by $R_2$ include an alkoxy group having a carbon number of 1 to 5 such as a methoxy and ethoxy group, an acyloxy group such as an acetoxy and a propionyloxy group, a halogen atom such as a chlorine atom and a bromine atom, a substituted silylamino group such as a trimethylsilylamino group, and the like.

Hydrolyzable organic silicon compounds used in the present invention are not limited and may be known ones, and can be roughly classified into alkoxysilane compounds, halogenated silane compounds, acyloxysilane compounds, silazane compounds, and the like. Hydrolyzable organic silicon compounds used in the present invention may be such organic silicon compounds, and may have a substituent such as an aryl group, a vinyl group, an allyl group, an acryloyloxy group, a methacryloyloxy group, an epoxy group, an amino group, a mercapto group and fluoroalkyl group, as a portion of $R_1$ and/or $R_2$ in the above formula (I).

Specific examples of the hydrolyzable organic silicon compounds include halogenated silane compounds such as methyltrichlorosilane; alkoxysilane compounds such as tetramethoxysilane, tetraethoxysilane, metyltrimethoxysilane, phenyltrimethoxysilane, phenyltriethoxysilane, dimethyldimethoxysilane, dimethyldiethoxysilane, vinyltrimethoxysilane, vinyltriethoxysilane, γ-aminopropyltriethoxysilane, N-(β-aminoethyl)-γ-aminopropyltrimethoxysilane, N-(β-aminoethyl)-γ-aminopropylmethyldimethoxysilane, γ-mercaptopropyltrimethoxysilane, γ-mercaptopropylmethyldimethoxysilane, γ-methacryloyloxypropyltrimethoxysilane, γ-methacryloyloxypropylmethyldimethoxysilane, γ-glycidoxypropyltrimethoxysilane and γ-glycidoxypropylmethyldimethoxysilane; silazane compounds such as hexamethyldisilazane; and the like. Each on these compounds may be used alone or may be used as a mixture of two or more of them.

A composition, from which a hydrophilic film of the present invention is made, comprises at least one compound selected from the group consisting of hydrolyzable organic silicon compounds, hydrolysis products thereof and multimers of the hydrolysis products. In other words, the composition may comprise a hydrolyzable organic silicon compound, or may comprise a hydrolyzed product obtained by hydrolyzing the organic silicon compound and/or a multimer (i.e., an oligomer, a polymer and the like) obtained by condensation of the hydrolyzed products. The hydrolysis products and the multimers of the hydrolysis products can be produced by adding, to the organic silicon compound, an acid such as hydrochloric acid, phosphoric acid and acetic acid, or a base such as sodium hydroxide or sodium acetate.

A commercially available hydrolyzable organic silicon compound may be used in the composition of the present invention, and examples thereof include "ColcoatR", "Colcoat 200", "Colcoat N-103X" and "Ethylsilicate 28", which are manufactured by Colcoat Corp., "MKC Silicate MS-51", "MKC Silicate MS-56", "MKC Silicate MS-57", "MKC Silicate MS-56S", "MKC Silicate MSH1" and "MKC Silicate MSH2", which are manufactured by Mitsubishi Chemical Corp., and the like.

As mentioned above, the composition contains:

(i) 60 parts by weight to 80 parts by weight of the inorganic compound particles in which the inorganic compound has an average particle diameter of 40 nm or less, when the composition contains 20 parts by weight and more but less than 40 parts by weight of the at least one compound; and (ii) 40 parts by weight to 60 parts by weight of the inorganic compound particles in which the inorganic compound particles are selected from the group consisting of chain-shaped, inorganic compound particles and needle-shaped, inorganic compound particles, when the composition contains 40 parts by weight and more but less than 60 parts by weight of the at least one compound, which is based on 100 parts by weight of the total weight of the inorganic compound particles and the at least one compound.

In composition (i) of the present invention, which contains 20 parts by weight and more but less than 40 parts by weight of the at least one compound (such as a hydrolyzable organic silicon compound) based on 100 parts by weight of the total weight of the inorganic compound particles and the at least one compound, the average particle diameter of inorganic compound particles is 40 nm or less, and is preferably 30 nm or less. When the average particle diameter exceeds 40 nm, the adhesiveness to the substrate and anti-abrasion properties of the resulting hydrophilic film may be insufficient, and transparency and hydrophilicity of the film may also be insufficient in some cases. On the other hand, the average particle diameter is preferably 5 nm or more from the viewpoint of ease of preparation. The shape of the inorganic compound particles having an average particle diameter of 40 nm or less is not particularly limited, and preferably has a sphere or granular shape. Sphere shapes here include spherical and elliptical spheres, including slightly distorted ones thereof. The ratio of the longest diameter to the shortest diameter of the inorganic compound particles may be in the range of from 1 to 3.

In the composition (i), as for the at least one compound (such as a hydrolyzable organic silicon compound) and the inorganic compound particles, the former is contained in the amount of 20 parts by weight to 40 parts by weight and the latter are contained in the amount of 40 parts by weight to 60 parts by weight, based on 100 parts by weight of the total weight thereof. Preferably, the former is contained in the amount of 20 parts by weight to 35 parts by weight. When the former is below 20 parts by weight, and when the latter exceeds 80 parts by weight, then adhesion properties to a resin molded article therein and anti-abrasion properties of the resulting hydrophilic film may be insufficient in some cases.

In composition (ii) of the present invention, which comprises the at least one compound in the amount of 40 parts by weight to 60 parts by weight based on 100 part by weight of the total weight thereof, chain-shaped or needle-shaped inorganic compound particles or both of them are contained. Such shaped inorganic compound particles can improve the transparency of the hydrophilic film and also can improve hydrophilicity of the hydrophilic film.

Here, a "chain-shaped particles" stands for particles having a shape like a chain in which a plurality of unit particles, each having a sphere shape, a granular shape and the like, is connected with one another. The chain length of the chain-shaped particles may be in the range of from 50 nm to 300 nm. The average diameter of the unit particles may be in the range of from 5 nm to 30 nm, and the number of the unit particles per chain-shaped particle may be in the range of from 5 to 10 on average.

Also, a "needle-shaped particles" stands for particles having a needle-like, long, slender shape, including particularly long, slender one, which may be sometimes called a hair shape or a feather shape. The length (longer diameter) on average of the needle-shaped particles (i.e., the average length of the needle-like shape) may be in the range of from 50 nm to 300 nm. The width (shorter diameter) of the needle-like particles on average (i.e., the average thickness of the needle-like shape) may be in the range of from 5 nm to 30 nm. The ratio of the length diameter to the breadth diameter may be in the range of 10 to 50 on average.

In composition (ii), as for the at least one compound (such as a hydrolyzable organic silicon compound) and inorganic compound particles, the former is contained in the amount of 40 parts by weight to 60 parts by weight and the latter is contained in the amount of 40 parts by weight to 60 parts by weight, based on 100 parts by weight of the total weight thereof. Preferably, the former is contained in the amount of 45 parts by weight to 60 parts by weight. When the former exceeds 60 parts by weight, and when the inorganic compound particles are less than 40 parts by weight, then the transparency of the resulting hydrophilic film may be insufficient, and also the hydrophilicity of the film may be insufficient in some cases.

In compositions (i) and (ii), starting materials of the inorganic compound particles contained can be selected appropriately, and are preferably metal oxides such as silica, alumina, tin oxide, antimony oxide and indium oxide; composite metal oxides such as tin-and-antimony composite oxide, indium-and-tin composite oxide. Among them, silica and alumina are more preferably used, since silica and alumina are excellent in hydrophilicity and have high strength. Two or more kinds of the above-described materials can be used, if necessary, as starting materials for the inorganic compound particles.

Upon preparing compositions (i) and (ii), inorganic compound particles may be used as they are in a solid form, or may be used in a sol form in which the inorganic compound particles are dispersed with a solvent such as water and an organic solvent. As described below, in preparing a paint from the composition, the inorganic compound particles in a sol form is preferably used.

Inorganic compound particles may be a commercially available ones. Examples of the commercially available inorganic compound particles having an average particle diameter of 40 nm or less include:

a silica in a sol form such as "Snowtechs" Series including "Snowtechs 20" and "Snowtechs C" and "Organosilica Sol" Series including "Organosilica Sol IPA-ST" and "Organosilica Sol MIBK-ST, which are manufactured by Nissan Chemical Industries, Ltd.;

an alumina in a sol form such as "Alumina Sol" Series including "Alumina Sol-520", which are manufactured by Nissan Chemical Industries, Ltd; and a silica in a solid form include "AEROSIL" Series such as "AEROSIL 50" and "AEROSIL 130", which are-manufactured by Nippon Aerosil Co., Ltd., and "Nipsil" Series such as "Nipsil E 200", which are manufactured by Nippon Silica Co., Ltd.

Examples of the commercially available, chain-shaped or needle-shaped inorganic compound particles include;

a silica in a sol form such as "Organosilica Sol IPA-ST-UP" and "Organosilica Sol MIBK-ST-UP", which are manufactured by Nissan Chemical Industries, Ltd.; and an alumina in a sol form such as "Alumina Sol-100" and "Alumina Sol-200", which are manufactured by Nissan Chemical Industries, Ltd.

In compositions (i) and (ii), a curable compound other than a hydrolyzable organic silicon compound may be contained, if necessary. Examples of such curable compound include cationic polymerizable compounds such as an epoxy compound, an oxcetane compound and a vinyl ether compound; radical polymerizable compounds such as an acrylate compound, a methacrylate compound, an acrylamide compound, a methacrylamide compound, a maleimide compound and a styrene derivative; and the like. The amount of the curable compound in compositions (i) and (ii) may be 100 parts by weight or less, based on 100 parts by weight of the at least one compound such as a hydrolyzable organic silicon compound; and may be in the range of from 10 parts by weight to 20 parts by weight, based on 100 parts by weight of the total weight of the curable compound, the at least one compound (such as a hydrolyzable organic silicon compound) and the inorganic compound particles.

When compositions (i) and (ii) are applied to a substrate, a paint is prepared from the compositions to be applied, preferably. The paint comprises compositions (i) and/or (ii) and a solvent.

A solvent can adjust and control a concentration and viscosity of the paint as well as a thickness of a film obtained after being cured. The solvent may be appropriately selected, and examples of the solvent include alcohols such as methanol, ethanol, propanol, isopropanol, n-butanol, 2-butanol, isobutanol and tert-butanol; alkoxyalcohols such as 2-ethoxyethanol, 2-butoxyethanol, 3-methoxypropanol, 1-methoxy-2-propanol and 1-ethoxy-2-propanol; ketols such as diacetone alcohol; ketones such as acetone, methylethylketone and methylisobutylketone; aromatic hydrocarbons such as toluene and xylene; esters such as etyl acetate and butyl acetate; and the like.

The amount of the solvent, which may be contained in a paint together with compositions (i) and (ii), is appropriated decided depending on a resin material, a shape and an application method of the resin molded article to which the resulting pain is applied, as well as the thickness of the resulting film which is made from the paint. Specifically, the amount of the solvent may be in the range of from 20 parts by weight to about 10,000 parts by weight based on the compositions (i) and (ii).

A paint is preferably obtained using as a solvent dioxane and/or tetrahydrofuran to be applied to a resin molded article as a substrate and then to be cured thereon, since the resulting hydrophilic film has a further improved adhesiveness to the substrate. The amount of dioxane and/or tetrahydrofuran to be used in the paint is preferably 5% by weight or more based on the total amount of the paint in terms of adhesiveness of the hydrophilic film to the substrate, and is preferably 50% by weight or less from the standpoint of an appearance of the resulting covered resin molded article.

A paint may contains a catalyst for curing, such as an acid, an alkali, an organic metal compound and a metal ion, in order to promote the curing of the at least one compound such as a hydrolyzable organic silicon compound. Also, when composition (i) or (ii) contains a curing compound other than a hydrolyzable organic silicon compound, then composition (i) or (ii) preferably contains an initiator selected appropriately depending on the curing compound, as well. For instance, when composition (i) or (ii) contains a cationic polymerizable compound, the composition (i) or (ii) preferably contains a cationic polymerizing initiator such as an onium salt including a diazonium salt, a sulfonium salt and an iodonium salt. Also, composition (i) or (ii) contains a radical polymerizable compound, the composition (i) or (ii) preferably contains a radical polymerizing initiator such as a benzyl, a benzophenone and a derivative thereof, a thioxanthone, a benzyldimethylketal, an α-hydroxyalkylphenon, a hydroxyketone, an aminoalkylphenon and an acylphosphineoxide.

Also, if necessary, a paint may contains a variety of additives such as a stabilizer, an antioxidant, a coloring agent, a leveling agent and surfactant. Particularly, a silicone oil as a leveling agent is preferably added in the paint, since the silicon oil not only improves leveling properties, but improves surface sliding properties of the and also improves surface hardness, of the resulting hydrophilic film.

Examples of the silicone oil include a dimethylsilicone oil, a phenylmethylsilicone oil, an alkyl-, aralkyl-modified silicone oil, a fluorosilicone oil, a polyether-modified silicone oil, an aliphatic ester-modified silicone oil, a methylhydrogensilicone oil, a silanol group-containing silicone oil, an alkoxy group-containing silicone oil, a phenyl group-containing silicone oil, methaacryl-modified silicone oil, an amino-modified silicone oil, a carboxylic acid-modified silicone oil, a carbinol-modified silicone oil, an epoxy-modified silicone oil, mercapto-modified silicone oil, a fluorine-modified silicone oil, and a polyether-modified silicone oil. They are used alone or in combination of two or more kinds of them. Examples of the commercially available silicone oil include "BKY" Series such as "BKY-306" and "BKY-333", which are manufactured by Big Chemie Japan Corp., and the like.

The amount of the silicone oil contained in the paint may be 50 parts by weight or less based on 100 parts by weight of the total amount of the at least one compound such as hydrolyzable organic silicon compounds, the inorganic compound particles and the optional curing compound other than hydrolyzable organic silicon compounds. When the silicon oil is used too much, the optical performance and strength of the resulting hydrophilic film tends to be deteriorated.

The paint mentioned above may be applied to the substrate surface to prepare a coating containing the at least one compound such as hydrolyzable organic silicon compounds and inorganic compound particles. The paint may be applied by the method such as a micro-gravure coating method, a roll coating method, a dipping coating method, a flow coating method, a spin coating method, a die coating method, a cast transfer method, a spray coating method, and the like.

After preparing the coating, the film may be cured by, for example, heat to provide a hydrophilic film. The heating temperature may be in the range of from about 50° C. to about 120° C., and the heating time may be in the range of from about 1 minute to about 5 hours. When the coating contains a solvent, such a heat curing may be carried out in the state where the film contains the solvent, or may be carried out after the solvent is evaporated. When the solvent is evaporated, the coating may be allowed to stand at room temperature to conduct the evaporation, or may be dried by heat at a temperature of from about 30° C. to about 100° C. to conduct the evaporation. The drying time is, as required, selected depending on a material and a shape of the substrate, an application method of the paint to the substrate, a film thickness of the product, i.e., hydrophilic film, and the like.

Upon curing the coating, when a curable compound other than a hydrolyzable organic silicon compound is used, a curing method suitable for the curable compound may be carried out together with the method for curing the hydrolyzable organic silicon compound. One of such curing methods may be the ultraviolet irradiation method. In this method, the irradiation time of ultraviolet rays may be in the range of from about 0.1 second to about 60 seconds, the irradiation temperature may be in the range of from about 10° C. to about 40° C., and the irradiation energy may be in the range of from about 50 mJ/cm$^2$ to about 3000 mJ/cm$^2$. The curing of a hydrolyzable organic silicon compound and the curing of another curable compound may be carried in any order.

The hydrophilic film formed as described above has hydrophilicity and antifouling properties, and is excellent in adhesion properties to a resin molded article and in anti-abrasion properties, and also excellent in transparency. Furthermore, the film may be excellent in durability and thus various properties of the film can be maintained over a long period of time. A resin molded article covered with a hydrophilic film of the present invention can be adopted as variety of applications, and particularly, is suitable for outdoor applications, which are readily subject to dirt and impact due to rain and wind, powdery dirt and dust, and the like, because of the above-described properties of the hydrophilic film. The outdoor applications may include materials of a signboard, building materials such as a carport roof, window materials, noise-insulation walls for a road and a railway, and the like.

A covered resin molded article of the present invention has a film that works as a hydrophilic film excellent in adhesion properties to a resin molded article and in anti-abrasion properties. The film is excellent in transparency.

The invention being thus described, it will be apparent that the same may be varied in many ways. Such variations are to be regarded as within the spirit and scope of the invention, and all such modifications as would be apparent to one skilled in the art are intended to be within the scope of the following claims.

The entire disclosure of the Japanese Patent Application Nos. 2003-360323 and 2003-360324, both filed on Oct. 21, 2003, and both including specification, claims and summary, are incorporated herein by reference in their entirety.

EXAMPLE

The present invention is described in more detail by reference to the following Examples, which should not be construed as a limitation upon the scope of the present invention.

In Examples and Comparative Examples, percentage (%) and parts of contents or amounts are % by weight and parts by weight, unless otherwise indicated. Resin plates with hydrophilic films obtained in Examples and Comparative Examples were evaluated by the methods below.

(1) Optical Properties

Total light transmittance (Tt) and haze of the obtained resin plates were measured using a transmittance meter (model: HR-100, manufactured by Murakami Color Research Laboratory) in accordance with JIS K 7105.

(2) Hydrophilicity

Contact angles of the surfaces of hydrophilic films relative to water were measured at a temperature of 25° C. by means of a contact angle meter (model: CA-X, manufactured by Kyowa Interface Science Co., Ltd.).

(3) Adhesion Properties

The resin molded articles to be evaluated were cut in with a cutter so as to penetrate the hydrophilic films and to make cuts of 100 squares with each side of 1 mm. Onto the cuts, an adhesive cellophane tape (produced by Nichiban Co., Ltd.: 24 mm side) was attached and then was peeled off to the perpendicular direction. The number of peeled squares for the 100 squares was counted to evaluate.

(4) Anti-Abrasion Properties

A tip of an eraser in an eraser abrasion testing device (manufactured by Motomitsu Manufactory Co., Ltd.) was covered with gauze, and was reciprocated on the surfaces of the hydrophilic films of the resin plate to be evaluated, until a scratch is visually observed, while applying a pressure of 49 $N/cm^2$ to the eraser. The films of the resin plate were evaluated by means of the number of reciprocations.

Example 1

An alkyl-silane solution (brand name: Colcoat N-103X, produced by Colcoat Corp.) (30 parts) containing a hydrolyzable organic silicon compound at a concentration of 3%, 7 parts of silica sol (brand name: Organosilicasol IPA-ST, produced by Nissan Chemical Industries Co., Ltd.) containing sphere-shaped silica particles having an average particle diameter (which was measured by BET process) of 15 nm at a concentration of 30%, 45 parts of ethanol, and 18 parts of dioxane were blended to prepare a hydrophilic paint with the ratio of the hydrolyzable organic silicon compound to the silica particles being 30 parts to 70 parts (the silicon compound/the silica particles=30 parts/70 parts).

Into the hydrophilic paint, an extrusion plate of a polymethylmethacrylate resin (brand name: Sumipex E, produced by Sumitomo Chemical Co., Ltd.) as a substrate was immersed and was dip coated at a pulling speed of 60 cm/min, and then was immediately heated at a temperature of 80° C. for 30 minutes, to produce a resin plate covered with a hydrophilic film. The evaluation results of the resin plate are shown in Table 1.

Example 2

A hydrophilic paint with the ratio of the hydrolyzable organic silicon compound to the silica particles being 30 parts to 70 parts (the silicon compound/the silica particles=30 parts/70 parts) was prepared in the same manner as in Example 1 except that 7 parts of sol (brand name: Organosilicasol IPA-ST-MS, produced by Nissan Chemical Industries Co., Ltd.) containing sphere-shaped silica particles having an average particle diameter (which was measured by BET process) of 20 nm at a concentration of 30% was used in stead of using 7 parts of sol (brand name: Organosilicasol IPA-ST) containing sphere-shaped silica particles having an average particle diameter of 15 nm at a concentration of 30%.

By utilizing the prepared hydrophilic paint, a resin plate covered with a hydrophilic film was produced in the same procedure as in Example 1. The evaluation results of the resin plate are shown in Table 1.

Comparative Example 1

A hydrophilic paint with the ratio of the hydrolyzable organic silicon compound to the silica particles being 50 parts to 50 parts (the silicon compound/the silica particles=50 parts/50 parts) was prepared in the same manner as in Example 1 except that the amounts of the alkyl-silane solution containing the hydrolyzable organic silicon compound at a concentration of 3%, the sol containing sphere-shaped silica particles having an average particle diameter of 15 nm at a concentration of 30% and ethanol were changed to be 50 parts, 5 parts and 27 parts from 30 parts, 7 parts and 45 parts, respectively.

By utilizing the prepared hydrophilic paint, a resin plate covered with a hydrophilic film was produced in the same procedure as in Example 1. The evaluation results of the resin plate are shown in Table 1.

The obtained resin plate covered with the hydrophilic film had a high haze, which corresponds to have low transparency.

Comparative Example 2

A hydrophilic paint with the ratio of the hydrolyzable organic silicon compound to the silica particles being 10 parts to 90 parts (the silicon compound/the silica particles=10 parts/90 parts) was prepared in the same manner as in Example 1 except that the amounts of the alkyl-silane solution containing the hydrolyzable organic silicon compound at a concentration of 3%, the sol containing sphere-shaped silica particles having an average particle diameter of 15 nm at a concentration of 30% and ethanol were changed to be 10 parts, 9 parts and 63 parts from 30 parts, 7 parts and 45 parts, respectively.

By utilizing the prepared hydrophilic paint, a resin plate covered with a hydrophilic film was produced in the same procedure as in Example 1. The evaluation results of the resin plate are shown in Table 1.

The obtained resin plate was inferior in adhesion properties between the hydrophilic film and the extrusion plate as a substrate.

Comparative Example 3

A hydrophilic paint with the ratio of the hydrolyzable organic silicon compound to the silica particles being 30 parts to 70 parts (the silicon compound/the silica particles=30 parts/70 parts) was prepared in the same manner as in Example 1 except that 7 parts of sol (brand name: Organosilicasol IPA-ST-L, produced by Nissan Chemical Industries Co., Ltd.) containing sphere-shaped silica particles having an average particle diameter of 45 nm at a concentration of 30% was used instead of using 7 parts of the sol (brand name: Organosilicasol IPA-ST) containing sphere-shaped silica particles having an average particle diameter of 15 nm at a concentration of 30%.

By utilizing the prepared hydrophilic paint, a resin plate covered with a hydrophilic film was produced in the same procedure as in Example 1. The evaluation results of the resin plate are shown in Table 1.

The obtained resin plate was inferior in anti-abrasion properties and in adhesion properties between the hydrophilic film and the extrusion plate as a substrate.

Comparative Example 4

A hydrophilic paint with the ratio of the hydrolyzable organic silicon compound to the silica particles being 30 parts to 70 parts (the silicon compound/the silica particles=30 parts/70 parts) was prepared in the same manner as in Example 1 except that 7 parts of sol (brand name: Organosilicasol IPA-ST-ZL, produced by Nissan Chemical Industries Co., Ltd.) containing sphere-shaped silica particles having an average particle diameter of 85 nm at a concentration of 30% was used instead of using 7 parts of the sol (brand name: Organosilicasol IPA-ST) containing sphere-shaped silica particles having an average particle diameter of 15 nm at a concentration of 30%.

By utilizing the prepared hydrophilic paint, a resin plate covered with a hydrophilic film was produced in the same procedure as in Example 1. The evaluation results of the resin plate are shown in Table 1.

The obtained resin plate was inferior in anti-abrasion properties and in adhesion properties between the hydrophilic film and the extrusion plate as a substrate.

Comparative Example 5

Dipentaerythritolhexaacrylate (0.9 part), 7 parts of sol (brand name: Organosilicasol IPA-ST, produced by Nissan Chemical Industries Co., Ltd.) containing sphere-shaped silica particles having an average particle diameter of 15 nm at a concentration of 30%, 0.1 part of 1-hydroxycyclohexylphenylketone (brand name: Irgacure 184, available from Ciba Specialty Chemicals Co., Ltd.) as a polymerization initiator, 44 parts of ethanol, 18 parts of dioxane and 30 parts of acetone were blended to prepare a hydrophilic paint with the ratio of the dipentaerythritolhexaacrylate to the silica particles being 30 parts to 70 parts (the dipentaerythritolhexaacrylate/the silica particles=30 parts/70 parts).

In the hydrophilic paint, an extrusion plate of a polymethylmethacrylate resin (brand name: Sumipex E, produced by Sumitomo Chemical Co., Ltd.) was immersed and was dip coated at a pulling speed of 60 cm/min. After drying at a room temperature (about 25° C.) for 1 minute, the resulting coated plate was heated at 60° C. for 10 minutes, and then was irradiated with ultraviolet rays with an amount of energy of about 1000 mJ/cm$^2$ using a high-pressure mercury lamp (model: UVC-3533, manufactured by Ushio Inc.) to produce a resin plate covered with a hydrophilic film. The evaluation results of the resin plate are shown in Table 1.

The resin plate thus obtained without a hydrolyzable organic silicon compound or substitute thereof was large in contact angle, which corresponds to low hydrophilicity, and was inferior in anti-abrasion properties.

TABLE 1

| Example | Amount of silica (parts) | Silica particle diameter (nm) | Tt (%) | Haze (%) | Contact angle (°) | Adhesion (The number of peeled squares) | Anti-abrasion (The number of reciprocation) |
|---|---|---|---|---|---|---|---|
| Example 1 | 70 | 15 | 93.2 | 0.6 | 6 | 0 | 300 |
| Example 2 | 70 | 20 | 93.6 | 0.5 | 10 | 0 | 130 |
| Comparative Example 1 | 50 | 15 | 92.8 | 3.3 | 14 | 0 | 350 |
| Comparative Example 2 | 90 | 15 | 94.3 | 0.6 | 10 | 100 | 100 |
| Comparative Example 3 | 70 | 45 | 94.3 | 0.6 | 14 | 100 | 10 |
| Comparative Example 4 | 70 | 85 | 95.3 | 2.2 | 23 | 100 | 20 |
| Comparative Example 5 | 70 | 15 | 92.4 | 0.9 | 33 | 0 | 10 |

Example 3

An alkyl-silane solution (brand name: Colcoat N-103X, produced by Colcoat Corp.) (50 parts) containing a hydrolyzable organic silicon compound at a concentration of 3%, 10 parts of sol (brand name: Organosilicasol IPA-ST-UP, produced by Nissan Chemical Industries Co., Ltd.) containing chain-shaped silica particles having an average chain length of 90 nm at a concentration of 15%, 22 parts of ethanol and 18 parts of dioxane were blended to prepare a hydrophilic paint with the ratio of the hydrolyzable organic silicon compound to the silica particles being 50 parts to 50 parts (the silicon compound/the silica particles=50 parts/50 parts). By utilizing the prepared hydrophilic paint, a resin plate covered with a hydrophilic film was produced in the same procedure as in Example 1. The evaluation results of the resin plate are shown in Table 2.

Comparative Example 6

A hydrophilic paint with the ratio of the hydrolyzable organic silicon compound to the silica particles being 30 parts to 70 parts (the silicon compound/the silica particles=30 parts/70 parts) was prepared in the same manner as in Example 3 except that the amounts of the alkyl-silane solution containing the hydrolyzable organic silicon compound at a concentration of 3%, the sol containing chain-shaped silica particles having an average chain length of 90 nm at a concentration of 15% and ethanol were changed to be 30 parts, 14 parts and 38 parts from 50 parts, 10 parts and 22 parts, respectively.

By utilizing the prepared hydrophilic paint, a resin plate covered with a hydrophilic film was produced in the same procedure as in Example 1. The evaluation results of the resin plate are shown in Table 2.

The obtained resin plate was inferior in adhesion properties between the hydrophilic film and the extrusion plate as a substrate.

Comparative Example 7

A hydrophilic paint with the ratio of the hydrolyzable organic silicon compound to the silica particles being 70 parts to 30 parts (the silicon compound/the silica particles=70 parts/30 parts) was prepared in the same manner as in Example 3 except that the amounts of the alkyl-silane solution containing the hydrolyzable organic silicon compound at a concentration of 3%, the sol containing chain-shaped silica particles having an average chain length of 90 nm at a concentration of 15% and ethanol were changed to be 70 parts, 6 parts and 6 parts from 50 parts, 10 parts and 22 parts, respectively.

By utilizing the prepared hydrophilic paint, a resin plate covered with a hydrophilic film was produced in the same procedure as in Example 1. The evaluation results of the resin plate are shown in Table 2.

The obtained resin plate covered with the hydrophilic film had a high haze, which corresponds to have low transparency.

Comparative Example 8

A hydrophilic paint with the ratio of the hydrolyzable organic silicon compound to the silica particles being 50 parts to 50 parts (the silicon compound/the silica particles=50 parts/50 parts) was prepared in the same manner as in Example 3 except that 5 parts of sol (brand name: Organosilicasol IPA-ST, produced by Nissan Chemical Industries Co., Ltd.) containing sphere-shaped silica particles having an average particle diameter of 15 nm at a concentration of 30% was used, instead of using 10 parts of the sol containing chain-shaped silica particles having an average chain length of 90 nm at a concentration of 15%, and the amounts of the ethanol were changed to be 27 parts from 22 parts.

By utilizing the prepared hydrophilic paint, a resin plate covered with a hydrophilic film was produced in the same procedure as in Example 1. The evaluation results of the resin plate are shown in Table 2.

The obtained resin plate covered with the hydrophilic film had a high haze, which corresponds to have low transparency.

TABLE 2

| Example | Amount of silica (parts) | Silica shape | Tt (%) | Haze (%) | Contact angle (°) | Adhesion (The number of peeled squares) | Anti-abrasion (The number of reciprocation) |
|---|---|---|---|---|---|---|---|
| Example 3 | 50 | Chain-shaped | 92.8 | 0.4 | 10 | 0 | 230 |
| Comparative Example 6 | 70 | Chain-shaped | 92.9 | 0.1 | 7 | 100 | 10 |
| Comparative Example 7 | 30 | Chain-shaped | 92.8 | 2.3 | 8 | 0 | 200 |
| Comparative Example 8 | 50 | Sphere-shaped | 92.8 | 3.3 | 14 | 0 | 350 |

Durability Testing

The durability testing of the resin plates covered with a hydrophilic film obtained in Examples 1 to 3 was carried out using a sunshine weatherometer under the conditions of a black panel temperature of 63° C., shower times of 18 minutes/120 minutes, and an irradiation time of 1,000 hours. After the testing, the appearance of the resin plates did not change, and the transparency of the resin plates was maintained. In addition, the contact angle of the resin plates relative to water was 10° or less, which shows that the hydrophilicity of the resin plates was also maintained.

What is claimed is:

1. A composition comprising inorganic compound particles and at least one compound selected from the group consisting of hydrolyzable organic silicon compounds, hydrolysis products thereof and multimers of the hydrolysis products, wherein based on 100 parts by weight of the total weight of the inorganic compound particles and the at least one compound, the composition contains:
  (i) 60 parts by weight to 80 parts by weight of the inorganic compound particles in which the inorganic compound has an average particle diameter of 40 nm or less, when the composition contains the at least one compound in the amounts of from 20 parts by weight to 40 parts by weight; or
  (ii) 40 parts by weight to 60 parts by weight of the inorganic compound particles in which the inorganic compound particles are selected from the group consisting of chain-shaped, inorganic compound particles and needle-shaped, inorganic compound particles, when the composition contains the at least one compound in the amounts of from 40 parts by weight to 60 parts by weight.

2. The composition according to claim 1, wherein the composition contains:
- 60 parts by weight to 80 parts by weight of the inorganic compound particles in which the inorganic compound has an average particle diameter of 40 nm or less; and
- 20 parts by weight to 40 parts by weight of the at least one compound.

3. The composition according to claim 1, wherein the composition contains:
- 40 parts by weight to 60 parts by weight of the inorganic compound particles in which the inorganic compound particles are selected from the group consisting of chain-shaped, inorganic compound particles and needle-shaped, inorganic compound particles; and
- 40 parts by weight to 60 parts by weight of the at least one compound.

4. The composition according to claim 3, wherein the inorganic compound particles have an average diameter of 50 nm to 300 nm in the major axis.

5. The composition according to any one of claims 1 to 4, wherein the inorganic compound particles are selected from the group consisting of silica particles and alumina particles.

6. A covered resin molded article comprising a resin molded article and a cured film present on at least a portion of the surface thereof, wherein the cured film is a film made from the composition according to any one of claims 1 to 4.

7. The covered resin molded article according to claim 6, wherein the resin molded article comprises a polymethylmethacrylate resin article.

8. The covered resin molded article according to claim 6, which is a signboard, a building material, a window material, or a noise-insulation wall for a road or a railway.

9. A paint comprising a composition according to any one of claims 1 to 4, a solvent and a silicone oil.

10. A film obtained by curing a composition according to any one of claims 1 to 4.

11. The covered resin molded article according to claim 7, which is a signboard, a building material, a window material, or a noise-insulation wall for a road or a railway.

* * * * *